(12) United States Patent
Kiely

(10) Patent No.: US 8,253,043 B1
(45) Date of Patent: Aug. 28, 2012

(54) SNAP-IN ELECTRICAL CONNECTOR WITH MULTIPLE FUNCTION RETAINER RING

(75) Inventor: Kenneth M. Kiely, Stratford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 309 days.

(21) Appl. No.: 12/834,866

(22) Filed: Jul. 12, 2010

Related U.S. Application Data

(60) Provisional application No. 61/224,529, filed on Jul. 10, 2009.

(51) Int. Cl.
*H02G 3/18* (2006.01)

(52) U.S. Cl. ........ 174/659; 174/665; 174/656; 174/650; 174/666; 439/557; 285/154.1

(58) Field of Classification Search .......... 174/657–666, 174/153 R, 71 R, 84 R, 68.1, 68.3, 70 R, 174/668, 669; 439/142, 557, 552, 92, 320, 439/507, 567; 285/139.1, 154.1, 149.1; 248/56, 248/49
See application file for complete search history.

(56) References Cited

U.S. PATENT DOCUMENTS

| 4,773,280 | A | * | 9/1988 | Baumgarten | 248/56 |
| 5,189,258 | A | * | 2/1993 | Pratesi | 174/669 |
| 5,266,050 | A | * | 11/1993 | O'Neil et al. | 174/659 |
| 6,352,439 | B1 | * | 3/2002 | Stark et al. | 174/655 |
| 6,444,907 | B1 | * | 9/2002 | Kiely | 174/657 |
| 6,860,758 | B1 | * | 3/2005 | Kiely | 439/557 |
| 7,060,900 | B1 | * | 6/2006 | Gretz | 174/652 |
| 7,064,272 | B2 | * | 6/2006 | Auray et al. | 174/659 |
| 7,075,007 | B2 | * | 7/2006 | Auray et al. | 174/668 |
| 7,205,489 | B2 | * | 4/2007 | Auray et al. | 174/666 |
| 7,214,890 | B2 | * | 5/2007 | Kiely et al. | 174/666 |
| 7,494,157 | B1 | * | 2/2009 | Kiely | 439/142 |
| 7,703,813 | B1 | * | 4/2010 | Kiely | 439/142 |

* cited by examiner

*Primary Examiner* — Angel R Estrada
(74) *Attorney, Agent, or Firm* — Briggs and Morgan, P.A.

(57) ABSTRACT

A connector assembly having an external retainer ring for both securing a connector body to an outlet box and also securing a conduit or cable from movement relative to the connector assembly. A multi-function retainer ring having a plurality of finger-like extensions or tabs with at least a portion of the extensions being inwardly bent. The inwardly bent tabs engage and retain a captured wire or conduit upon assembly. Other tabs function to engage an inner wall of a knock-out hole of an outlet box upon insertion of the connector assembly into the outlet box. A method of connecting a wire to a junction box using the connector assembly is also disclosed.

21 Claims, 9 Drawing Sheets

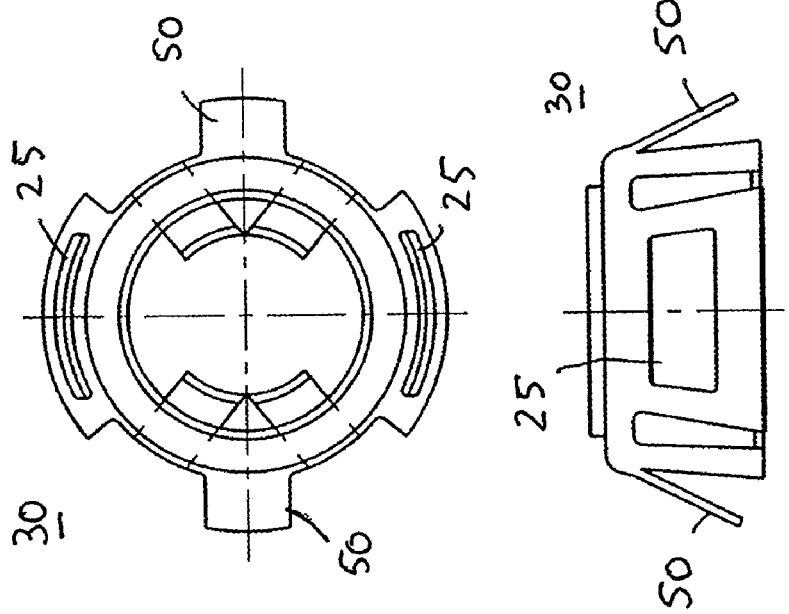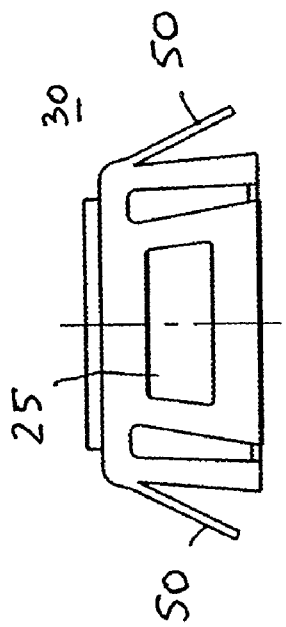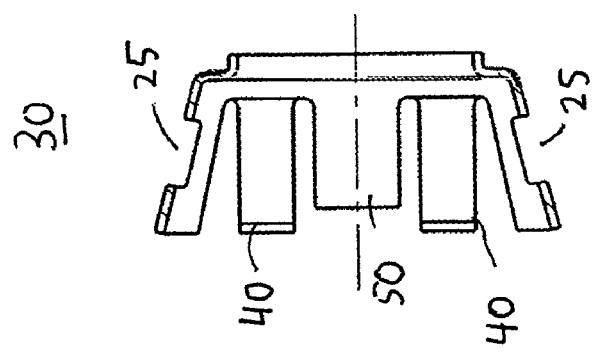

SNAP-IN ELECTRICAL CONNECTOR WITH
MULTIPLE FUNCTION RETAINER RING

RELATED APPLICATIONS

This application claims priority to U.S. Provisional Application Ser. No. 61/224,529, filed on Jul. 10, 2010, which is incorporated by reference herein in its entirety.

TECHNICAL FIELD

The invention is directed to a further advancement in the field of electrical connector assemblies. More specifically, this application relates to a snap-fit electrical connector assembly having a construction for facilitating the connection of the connector assembly and associated cable, wire conductor and the like to an electrical box.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box. Such known electrical connectors are either of a type that are secured to an electric box by a threaded lock nut or by means of a circular snap fit retainer ring of the type disclosed in U.S. Pat. Nos. 6,860,758; 6,444,907; 5,189,258; 5,266,050; and 5,171,164, for example, each incorporated by reference herein.

So called "snap fit" connectors have been in use for some time, including connectors disclosed in Applicant's U.S. Pat. Nos. 7,064,272; 7,075,007; 7,205,489 and 7,214,890, incorporated by reference herein. Such connectors have typically been coupled to the junction box by forcibly inserting one end of the connector into the knock-out hole of a junction box. Such connectors include a circular retainer ring which is deformed during insertion of the connector body into a knock-out hole. In the past, a generally linear motion has been used to insert the connector end into the junction box. Using such a straight motion, the connector end is pushed into the knock-out hole so as to deform a retainer ring as it passes through the knock-out hole.

One limitation of some prior art connector assemblies is the requirement of designated ground tab(s) defined upon the wire retainer. The ground tabs are adapted to engage an edge of a knock-out hole upon insertion of the connector assembly.

SUMMARY OF THE INVENTION

The present invention provides a connector assembly having an external retainer ring for both securing a connector body to an outlet box and also securing a conduit or cable from movement relative to the connector assembly.

An embodiment of the present invention includes a multi-function retainer ring having a plurality of finger-like extensions or tabs with at least a portion of the extensions being inwardly bent. These inwardly bent tabs engage a captured wire or conduit upon assembly. Other tabs function to engage an inner wall of a knock-out hole of an outlet box upon insertion of the connector assembly into the outlet box.

An embodiment of the present invention includes a retainer ring having combined connector body retention and conduit or cable retention features. One aspect of the present invention is the provision of a retainer ring without designated ground tabs. In at least some embodiments of the present invention, the plurality of tabs of the wire retainer together function as ground conductors.

An object of the present invention is the provision of a compact connector assembly having an overall size in an axial direction which is substantially smaller (shorter) than prior art connector assemblies.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 7 and 8 are side elevational views of the retainer ring of FIG. 1.

FIG. 9 is a top plan view of the retainer ring of FIG. 1.

DETAILED DESCRIPTION OF THE INVENTION

Figure 1:
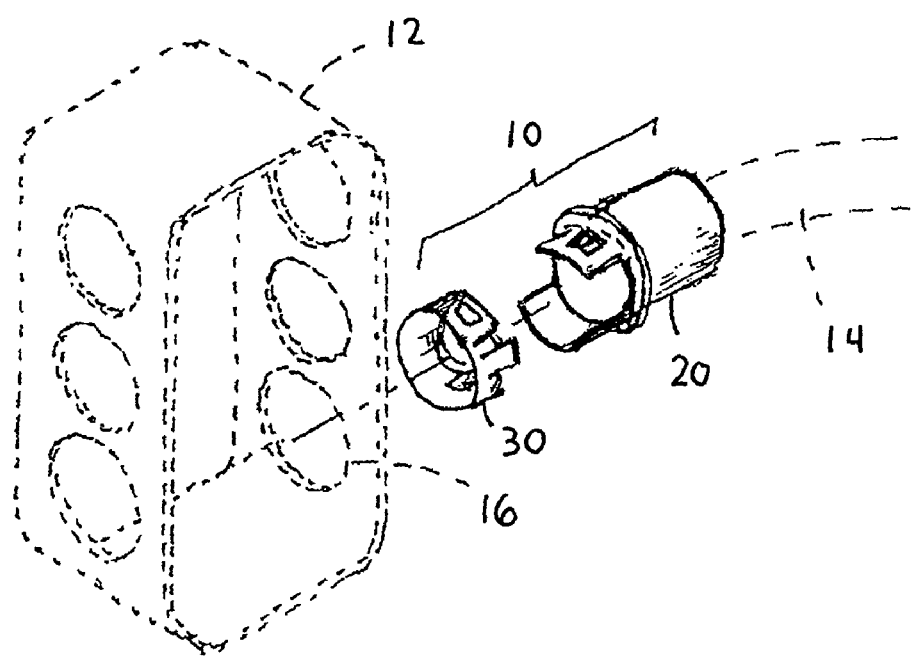
FIG. 1 is a perspective view of an electrical connector assembly in accordance with the present invention, depicted as being attached to an electrical junction box.

Referring to the drawings, FIG. 1 is a perspective view of the first embodiment of an electrical connector assembly 10 in accordance with the present invention. FIG. 1 depicts connector assembly 10 in a partially disassembled state relative to a junction box 12 and electric wire 14. As used herein, the term "wire" 14 includes a variety of different conduits and cable constructions, including shielded and unshielded conductor assemblies. Wire 14, as used herein, means any wire, cable, helical wound metal covering or sheath (BX) wire, plastic sheath wire conductor and the like. As described hereinafter, connector assembly 10 is used to mechanically couple electrical wire 14 at knock-out hole 16 of junction box 12.

Figure 2:
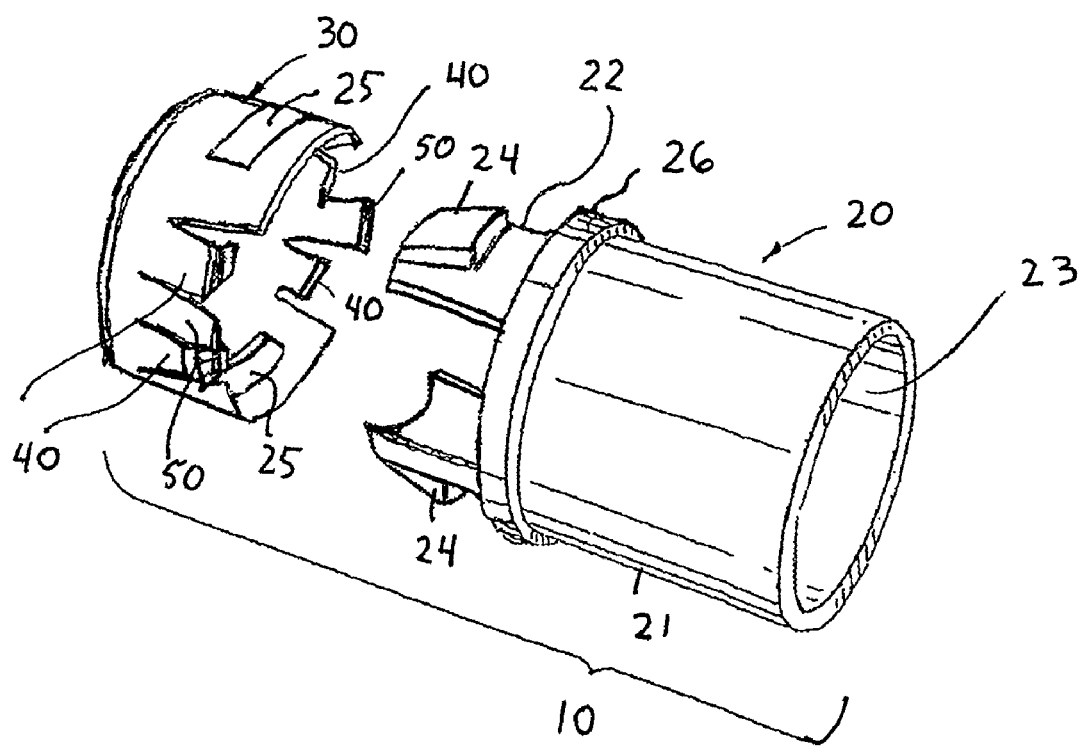
FIG. 2 is a perspective view of the electrical connector assembly of FIG. 1.

Referring now to FIG. 2, connector assembly 10 includes connector body 20 and retainer ring 30. Connector body 20 is preferably formed of metallic or non-metallic material. For example, connector body 20 may be made of a zinc alloy or other suitable metallic alloy or a non-metallic plastic or resin material. Connector body 20 is formed with an inlet end portion 21 and an outlet end portion 22 and a bore 23 extending therethrough. Outlet end portion 22 defines a substantially cylindrical form and includes wedge-shaped lugs 24 adapted to be received with apertures 25 of retainer ring 30.

Intermediate the connector body 20, in the illustrated embodiment between the inlet end portion 21 and outlet end portion 22, there is provided radially outwardly extending flange 26 which functions as a stop to limit the degree to which connector body 20 may be inserted through the knock-out hole 16 of junction box 12. In the illustrated embodiment, stop flange 26 is unbroken, while in alternative embodiments stop flange 26 may comprise disjointed or separated elements encircling connector body 20 and together functioning to limit the degree to which connector body 20 may be inserted into junction box 12.

In the illustrated embodiment, retainer ring 30 is somewhat cylindrical or frusto-conical in form and adapted in size to be received onto the outlet end portion 22. Retainer ring 30 includes a plurality of finger-like extensions or tabs 40, 50. Wire-retaining tabs 40 are inwardly bent and sized to suitably engage retained wire 14. Wall-engaging tabs 50 are sized to operatively engage an inner wall of the junction box 12 upon insertion of the connector assembly 10. Wall-engaging tabs 50 are shown as generally unbent along their lengths. In alternative embodiments, the wall-engaging tabs 50 may be bent, curved, or otherwise formed.

The orientation of wire-retaining tabs 40 is such that the opposed spring fingers are oppositely disposed to firmly grip wire 14, e.g. an armored conductor or other covered conductor. Wire-retaining tabs 40 function as a unidirectional retainer means arranged to permit wire 14 to be readily inserted and secured thereinto, and which will resist applied force imparted to wire 14 in the opposite direction to prohibit any unintentional separation of wire 14 from the connector body 20.

Figure 3:
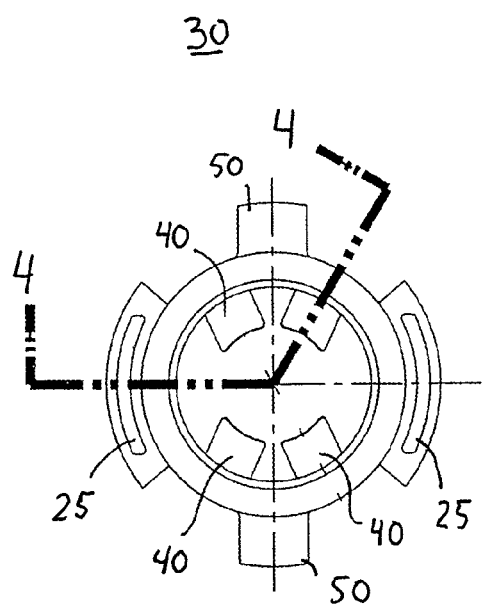
FIG. 3 is a top plan view of the electrical connector assembly of FIG. 1.
Figure 4:
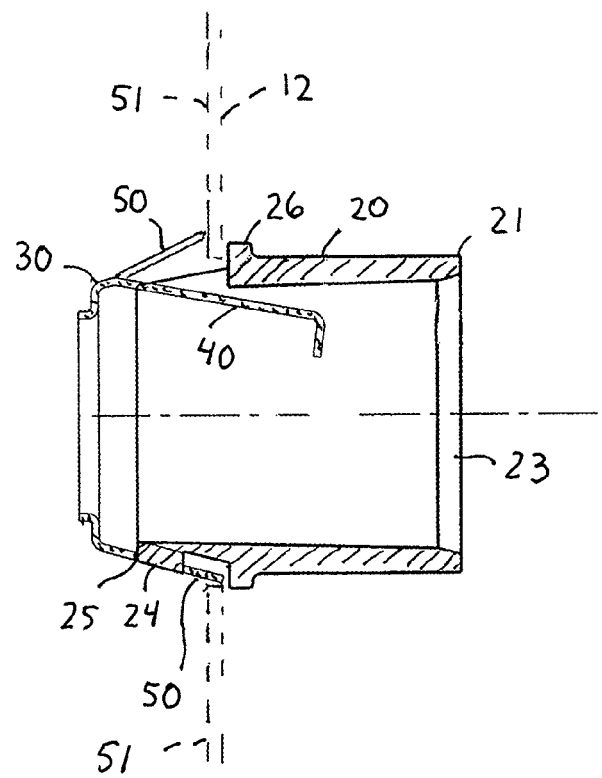
FIG. 4 is a cross sectional view of the electrical connector assembly of FIG. 1 taken along lines 4-4 of FIG. 3.

FIG. 3 is a top plan view of connector assembly 10. FIG. 4 depicts a cross-sectional view of the connector assembly 10 taken along line 4-4 of FIG. 3. A wall 51 of junction box 12 is shown in phantom lines to depict full insertion of connector assembly 10 into knock-out hole 16. Once the connector assembly 10 is fully inserted into the knock-out hole 16, the wall-engaging tabs 50 of retainer ring 30 together function to secure the connector assembly against withdrawal. In the illustrated embodiment, tabs 50 spring outwardly upon insertion into the junction box 12. It will be understood that wire 14 may be secured to the connector assembly 10 either before or after the assembly 10 has been secured to the junction box 12.

Figure 5:
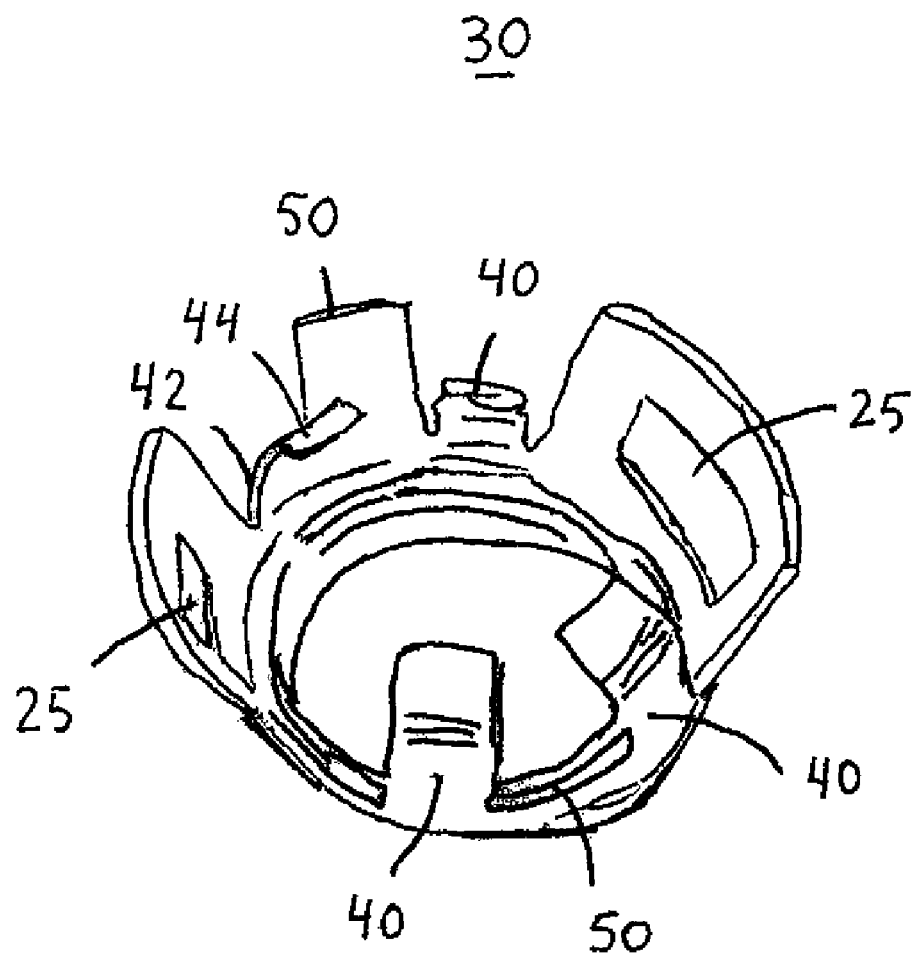
FIG. 5 is a perspective illustration of a retainer ring of FIG. 1.

FIG. 5 is a perspective illustration of retainer ring 30 showing the plurality of wire-retaining tabs 40 and the plurality of wall-engaging tabs 50. Apertures 25 in retainer ring 30 are adapted to receive lugs 24 of connector body 20 and thereby effectively secure retainer ring 30 upon the connector body 20. As shown in FIG. 5, the wire-retaining tabs 40 include a first portion 42 inwardly angled and a second portion 44 more inwardly angled than portion 42. The size, length, angles, etc. of wire-retaining tabs 40 would vary depending on a particular application.

Figure 6:
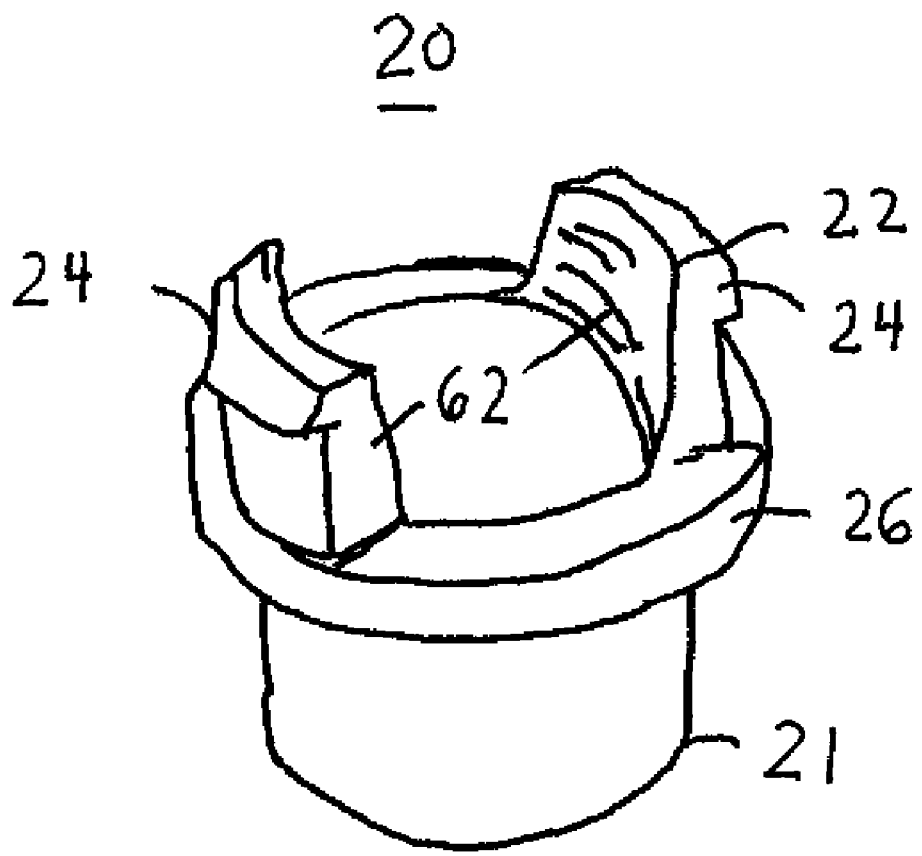
FIG. 6 is a perspective illustration of the connector body of FIG. 1.

FIG. 6 is a perspective illustration of connector body 20. In this embodiment, the end 22 of connector body 20 defines a bifurcated end having a pair of generally opposite leg elements 62. Lugs 24 are formed at distal ends of leg elements 62.

FIGS. 7 and 8 are side elevational views of retainer ring 30. FIG. 9 is a top plan view of retainer ring 30.

Figure 10:
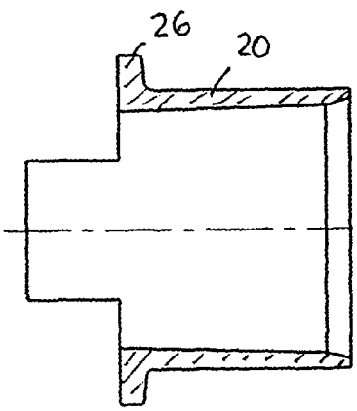
FIG. 10 is a cross-sectional view of the connector body of FIG. 1.
Figure 11:
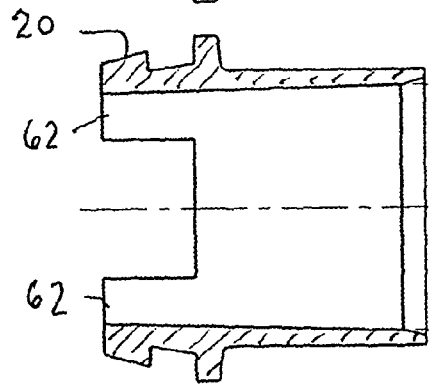
FIG. 11 is a cross-sectional view of the connector body of FIG. 1.
Figure 12:
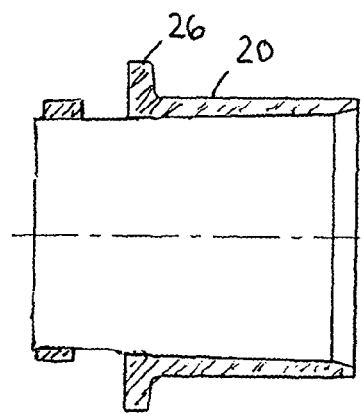
FIG. 12 is a cross-sectional view of an alternative embodiment of a connector body.
Figure 13:
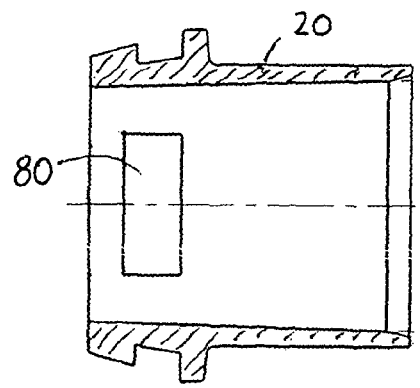
FIG. 13 is a cross-sectional view of an alternative embodiment of a connector body.
Figure 14:
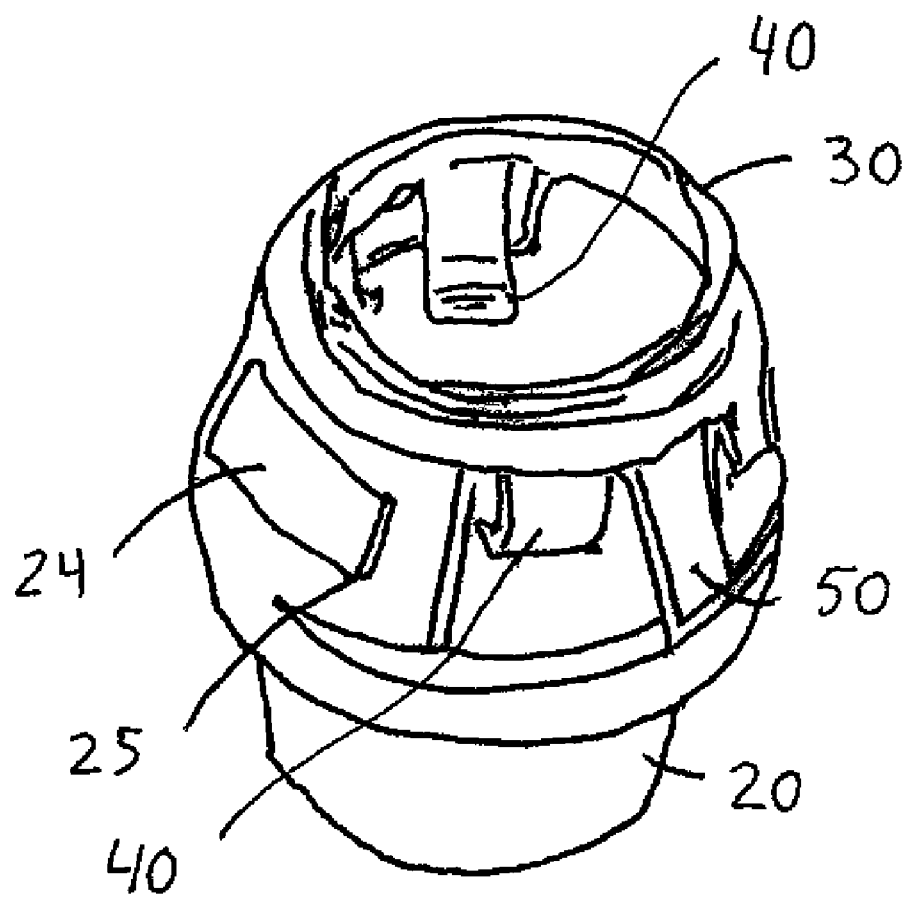
FIG. 14 is a perspective view of the connector assembly of FIG. 1.
Figure 15:
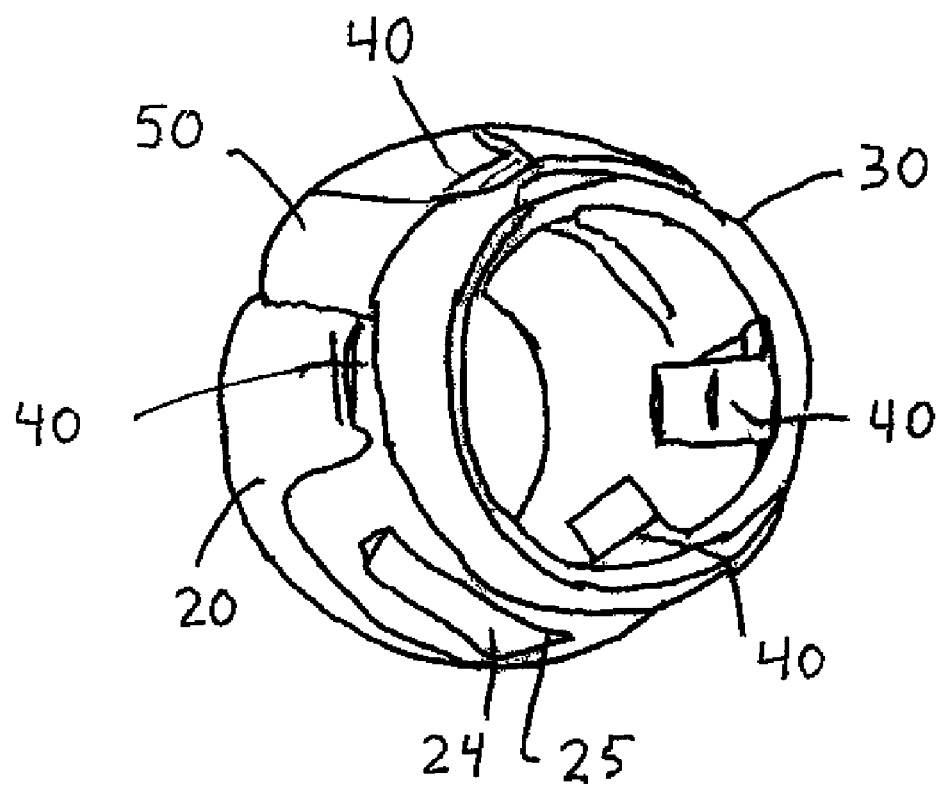
FIG. 15 is a perspective view of the connector assembly of FIG. 1.

FIGS. 10-11 are cross-sectional views of connector body 20. FIGS. 12-13 are cross-sectional views of an alternative embodiment of connector body 20 wherein end 22 is not split as in FIG. 6. In this embodiment, one or more wire-retaining tabs 40 pass through aperture 80. FIGS. 14 and 15 are perspective illustrations of the connector body 20 and retainer ring 30 as assembled.

According to one embodiment of the present invention, a method of connecting a wire 14 to a junction box 12 using the electrical connector assembly 10 includes steps of: providing the retainer ring 30 connected to the connector body 20; inserting the outlet end portion 22 of the connector body 20 and at least a portion of the retainer ring 30 into a knock-out hole of the junction box 12, with the inserting causing the wall-engaging tab 50 to deflect and engage an inner wall surface 51 of the junction box 12; and inserting the wire 14 into the inlet end portion 21 of the connector body 20, with the inserting causing the wire 12 to deflect a wire-retaining tab 40, with the tab 40 engaging an outer surface of the wire 14 to restrain the wire 14 from disengagement from the junction box 12.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electrical connector assembly for securing an electrical conductor to an electrical box comprising:
   a connector body having an inlet end portion, and an outlet end portion, and a stop flange; and
   a retainer ring secured upon said outlet end portion with said retainer ring defining a plurality of tabs including at least one wire-retaining tab adapted to engage a conduit received within said connector body and at least one wall-engaging tab adapted to engage an inner wall of the electrical box upon insertion of the connector assembly into a knock-out hole of the electrical box.

2. The electrical connector assembly of claim 1 wherein the retainer ring defines an opening through which a lug on the connector body is received by which the retainer ring is secured to the connector body.

3. The electrical connector assembly of claim 2 wherein the opening includes at least one rectangular aperture.

4. The electrical connector assembly of claim 1 wherein the retainer ring defines a plurality of openings through which a plurality of lugs on the connector body are received by which the retainer ring is secured to the connector body.

5. The electrical connector assembly of claim 1 wherein the connector body is defined by a bifurcated end at the outlet end portion.

6. The electrical connector assembly of claim 5 wherein said at least one wire-retaining tab is positioned between bifurcations at the outlet end portion of the connector body.

7. The electrical connector assembly of claim 5 wherein the bifurcated end includes at least one lug adapted to secure the retainer ring onto the connector body.

8. A method of connecting a wire to a junction box using the electrical connector assembly of claim 1 comprising:
providing the retainer ring connected to the connector body;
inserting the outlet end portion of the connector body and at least a portion of the retainer ring into a knock-out hole of the junction box, with said inserting causing said at least one wall-engaging tab to deflect and engage an inner wall surface of the junction box; and
inserting the wire into the inlet end portion of the connector body, with said inserting causing the wire to deflect said at least one wire-retaining tab, with said tab engaging an outer surface of said wire to restrain said wire from disengagement from said junction box.

9. An electrical connector assembly for securing an electrical conductor to an electrical box comprising:
a connector body having an inlet end portion, and an outlet end portion, and a stop flange; and
a retainer ring secured upon said outlet end portion by a lug projecting from an outlet end portion surface and passing at least partially through an opening of the retainer ring, and said retainer ring including at least one wire-retaining tab projecting into a connector body interior and at least one wall-engaging tab adapted to engage an inner wall surface of the electrical box upon insertion of the connector assembly.

10. The electrical connector of claim 9 wherein the outlet end portion is defined by a bifurcation and wherein said lug projects from a surface of said bifurcation.

11. The electrical connector of claim 10 wherein the bifurcation defines a pair of lugs which are generally 180 degrees apart.

12. The electrical connector of claim 11 wherein a pair of wire-retaining tabs are positioned between the pair of lugs.

13. The electrical connector of claim 12 wherein a pair of wall-engaging tabs are positioned between the pair of lugs.

14. The electrical connector of claim 13 wherein a pair of wire-retaining tabs are separated by a wall-engaging tab.

15. A retainer ring adapted to be received upon an end of an electrical connector body to define an electrical connector assembly for securing an electrical conductor to an electrical box, said retainer ring comprising:
a ring form having a plurality of extension tabs including a wire-retaining tab adapted to engage wire within the connector body and a wall-engaging tab adapted to engage a wall-surface of an electrical box, and further having at least one opening through which a lug of the connector body is received, said lug adapted to secure the retainer ring to the connector body.

16. The retainer ring of claim 15 wherein three extension tabs are defined on one side of the retainer ring, including a pair of wire-retaining tabs separated by a wall-engaging tab.

17. The retainer ring of claim 15 comprising four wire-retaining tabs and two wall-engaging tabs.

18. The retainer ring of claim 17 wherein the two wall-engaging tabs are generally 180 degrees apart.

19. The retainer ring of claim 18 wherein two of the four wire-retaining tabs are generally 180 degrees apart.

20. The retainer ring of claim 19 wherein a pair of wire-retaining tabs are separated by a wall-engaging tab.

21. The retainer ring of claim 15 wherein the ring form is generally cylindrical or generally frusto-conical.

* * * * *